United States Patent [19]

Sogabe et al.

[11] Patent Number: 5,646,682

[45] Date of Patent: Jul. 8, 1997

[54] TRACK WIDTH ERROR INSPECTOR APPARATUS

[75] Inventors: Yasushi Sogabe, Osaka; Shigeki Murata, Nara, both of Japan

[73] Assignee: Matsushita Electric Industrial Co., Ltd., Osaka, Japan

[21] Appl. No.: 593,018

[22] Filed: Jan. 29, 1996

Related U.S. Application Data

[63] Continuation of Ser. No. 135,529, Oct. 13, 1993, abandoned.

[30] Foreign Application Priority Data

Oct. 13, 1992 [JP] Japan .................................. 4-274005

[51] Int. Cl.$^6$ .............................................. H04N 7/18
[52] U.S. Cl. .......................... 348/135; 348/125; 348/88; 348/92; 348/131
[58] Field of Search .............................. 348/94–95, 125, 348/131, 135, 8, 88, 127, 86, 92; 360/25, 31; 382/141; 356/372, 373; H04N 7/18; G06K 9/00

[56] References Cited

U.S. PATENT DOCUMENTS

| | | | |
|---|---|---|---|
| 4,816,052 | 3/1989 | Horvath | 348/94 |
| 5,046,112 | 9/1991 | Chang et al. | 382/8 |
| 5,142,588 | 8/1992 | Sogabe et al. | 356/372 |
| 5,189,491 | 2/1993 | Sogabe et al. | 382/8 |
| 5,294,791 | 3/1994 | Pahr | 350/548 |

FOREIGN PATENT DOCUMENTS

| | | | |
|---|---|---|---|
| 035720 | 9/1981 | European Pat. Off. | G01B 11/02 |
| 440396 | 8/1991 | European Pat. Off. | G11B 20/198 |
| 4-41403 | 7/1992 | Japan | G11B 5/00 |

*Primary Examiner*—Tommy P. Chin
*Assistant Examiner*—Vu Le
*Attorney, Agent, or Firm*—Wenderoth, Lind & Ponack

[57] ABSTRACT

A track width error inspector apparatus for examining a width error of recording tracks of a magnetic tape, in which a signal of a given frequency range is recorded on alternate tracks with a plurality of magnetic heads and magnetic powder is applied to the tape and light is radiated thereon and a reflection of the light therefrom is detected, includes: a movable table on which the tape is disposed; an image pick-up for producing an image of the recording tracks; a memory for storing image data from the image pickup; a frequency spectrum detector for detecting frequency components of a frequency spectrum produced by a Fourier transformation of the image data; a ratio calculator for calculating a ratio between one odd-numbered order frequency component and one even-numbered order frequency component; and a track width error calculator for calculating the width error of the recording tracks from the calculated ratio.

3 Claims, 5 Drawing Sheets

TRACK WIDTH ERROR INSPECTOR APPARATUS

This application is a Continuation of now abandoned application Ser. No. 08/135,529, filed Oct. 13, 1993.

BACKGROUND OF THE INVENTION

1. Field of the Invention

The present invention relates to a track width error inspector apparatus for detecting errors in the width of recording tracks on a magnetic recording tape.

2. Description of the Prior Art

It is now desired to reduce a width of recording tracks on a magnetic recording tape for implementation of higher density recording. For reducing the width of recording tracks, one of the requirements is to carry out recording on and reproducing from a precise location of the target recording track. In common, the recording on the precise location on a recording track is interrupted by (1) deflection of the recording track and (2) error in the width of the recording track. The track deflection (1) from its original linear course is mainly caused by faulty operation of a recording mechanism or a processing error of a magnetic recording tape. Accordingly, a deflected recording track recorded by one mechanism of the system will hardly be reproduced by another mechanism to impair the system compatibility. Commonly, the track width error (2) results from faulty rewriting on a recording track with gap distance error of a head, heightwise displacement of the head, or eccentric rotation of a cylinder. If there is a track width error during recording, a desired level of signal will unsuccessfully be reproduced regardless of appropriate tracking. Accordingly, elimination of the recording track deflection and the track width error is the most important thing to be tackled for implementation of the forgoing recording track system. In order to eliminate errors of the track, it is necessary to examine the deterioration conditions of recording track error.

For this purpose, a conventional track width error inspector apparatus is provided for visualizing recording tracks on a magnetic tape using a magnetic fluid. The magnetic tape carrying the visualized recording tracks is disposed on a movable table and while it is moved width-wisely of the magnetic tape or of the recording track, its recording tracks are each visually examined or are examined a given number of equal intervals. The borderline of the recording tracks of the magnetic tape can be examined by producing their image on an optoelectric transducer and measuring a change in the voltage associated with the borderline between two adjacent recording tracks in the image (Japanese Laid-open Patent Publication No. 4-41403(1992)). This technique has been introduced for minimizing measuring error in the visual inspection of recording tracks which varies depending on the skill of inspectors and therefore, its principle for inspection is not different from that of the conventional inspection apparatus. The width of each of the recording tracks is measured between the two borderlines and compared with a reference track width to calculate an error in the track width.

The method of the conventional apparatus however takes a considerable length of time to detect the borderlines of the recording tracks since the number of recording tracks over the width of a magnetic tape of the VHS format is as high as 170. Also, for detecting changes in the track width lengthwisely of the magnetic tape, the measuring action has to be repeated several times and also takes a considerable length of time. The narrower the recording track width, the more the care should be taken in measuring the width error in sub micrometer order. Therefore, the accuracy of measurement will be critical. In fact, the conventional visual inspection method permits the error of the acknowledgement of the borderlines and inconsistency between inspectors as high as 1 micrometer. Also, the movement of the table which moves the magnetic tape contains error. Accordingly, the movement of the table should also be executed at a specified accuracy of repeatability and a precision of location.

SUMMARY OF THE INVENTION

It is an object of the present invention to measure an error in the recording track width readily and simply on the two-dimensional plane of a magnetic tape to be inspected.

For achievement of the object, a track width error inspector apparatus according to the present invention comprises a movable table on which the magnetic tape to be inspected is disposed; an image pick-up for producing an enlarged two-dimensional image of the recording tracks in a given surface area of the magnetic tape; a memory for storing an image data produced by the image pick-up; a frequency spectrum detector for detecting frequency components of a frequency spectrum produced by a Fourier transformation of the image data; a calculator for calculating a ratio between one of odd-numbered order frequency components and one of even-numbered order frequency components; and a track width error calculator for calculating an error in the track width from the ratio between the two frequency components. Preferably, the ratio is calculated between the first frequency component and the second frequency component of the frequency spectrum. Also, it is preferred to perform the Fourier transformation widthwisely of the magnetic tape while the magnetic tape is disposed on the table with its running direction aligned with the coordinate axis of the image produced by the image pick-up.

Accordingly, the track width error can be detected on the two-dimensional plane of the magnetic tape with ease and readiness.

PREFERRED EMBODIMENT OF THE PRESENT INVENTION

Figure 1:
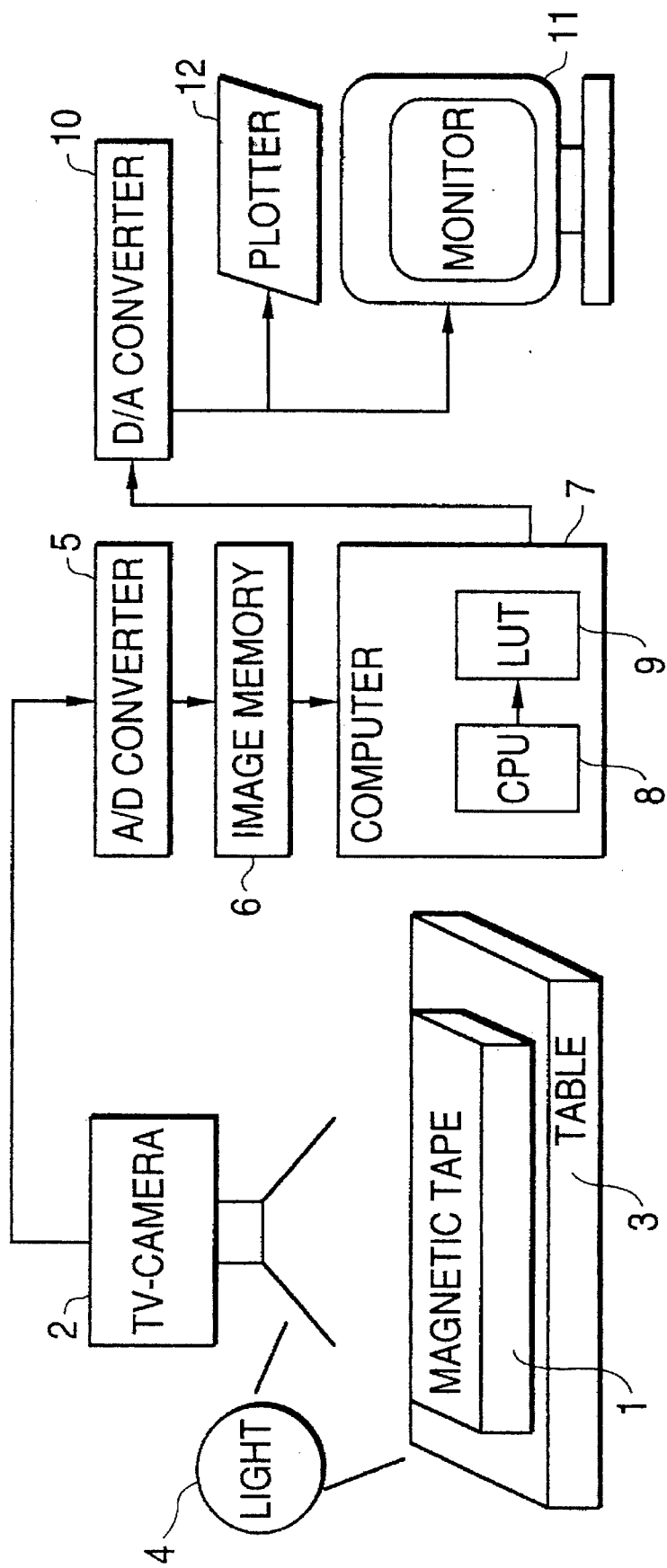
FIG. 1 is a diagram of a track width error inspector apparatus showing one preferred embodiment of the present invention.

FIG. 1 is a diagram of a track width error inspector apparatus according to one embodiment of the present invention, in which a magnetic tape 1 carries visualized recording tracks developed using a magnetic fluid. A television camera 2 is provided for viewing the magnetic tape 1 vertically of its surface to produce an enlarged image of recording tracks. Hence, a table 3 is disposed at a right angle to an optical axis of the television camera 2 to hold the magnetic tape 1 without any deflection from its surface plane. The table 3 is also arranged to be movable across the plane. A light source 4 illuminates the magnetic tape 1 from a predetermined direction for ease of viewing the visualized recording tracks. An A/D converter 5 converts an analog video signal produced by the television camera 2 to its 8-bit digital form. An image memory 6 stores the digital video signal outputted from the A/D converter 5. A computer 7 includes a CPU 8 and a look-up table 9 for processing the digital video signal retrieved from the image memory 6 using a software with the CPU 8 to generate track width error data. The track width error data is then converted by a D/A converter 10 to an analog output signal which is transferred to a monitor 11 for video display and to a plotter 12 for graphic output.

Figure 2:
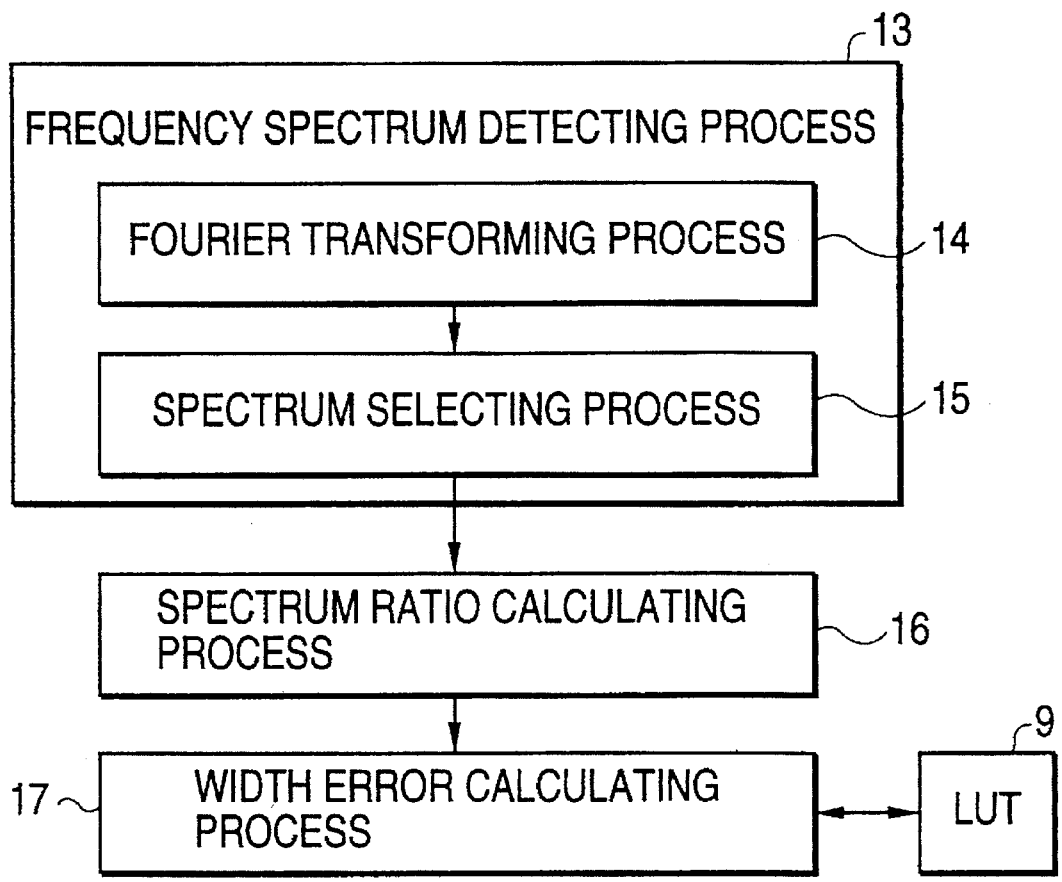
FIG. 2 is a diagram showing a calculating procedure in a CPU.

FIG. 2 is a flowchart of a sequence of processes operated by software of the CPU 8. The sequence with processes starts with a frequency spectrum detecting process 13 which comprises a Fourier transforming process 14 and a spectrum selecting process 15. The sequence also includes a spectrum ratio calculating process 16 and a width error calculating process 17 which operates with reference to a look-up table 9.

The track width error inspector apparatus of the present invention having the foregoing arrangement will be described referring to the accompanying drawings.

As shown in FIG. 1, the magnetic tape 1 with an amount of magnetic powder applied over its surface is disposed on the table 3 at a location to be focused by the television camera 2. As a light is radiated from the light source 4 to illuminate the magnetic tape 1, the intensity of its reflection is detected in the form of a series of alternate brightness and darkness levels representing a row of recording tracks. This appears because a data signal of a given frequency range is recorded in alternate directions on the recording tracks. Also, a technique of illumination for visualizing the recording tracks is well known as depicted in Japanese Laid-open Patent Publication No. 4-41403 (1992).

Figure 3:
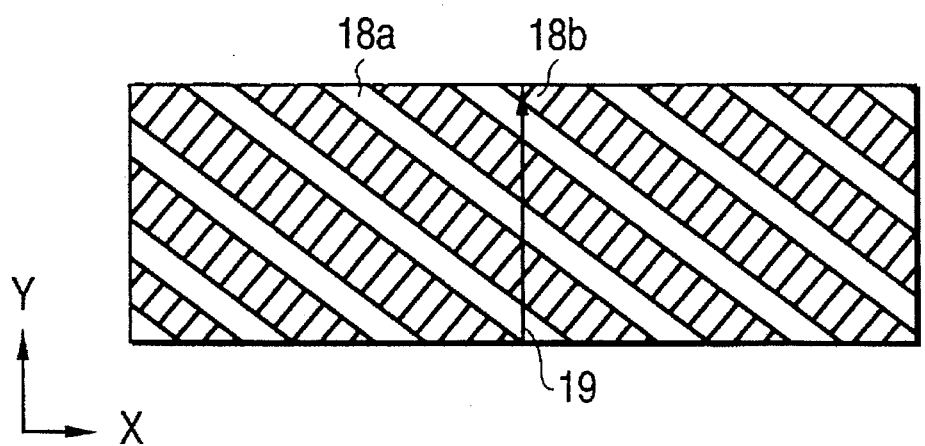
FIG. 3 is a view showing an image of recording tracks.

The visualized recording tracks are translated with the television camera 2 into a two-dimensional enlarged image which is then converted by the A/D converter 5 to a digital 8-bit video signal and stored in the image memory 6. FIG. 3 illustrates the image of the recording tracks recorded by the television camera 2 into the memory 6, in which the X direction represents the lengthwise direction of the magnetic tape 1 and the Y direction is the widthwise direction of the same. As shown, the recording track 18a carries a brightness level of the signal while the recording track 18b carries a darkness level.

Figure 4:
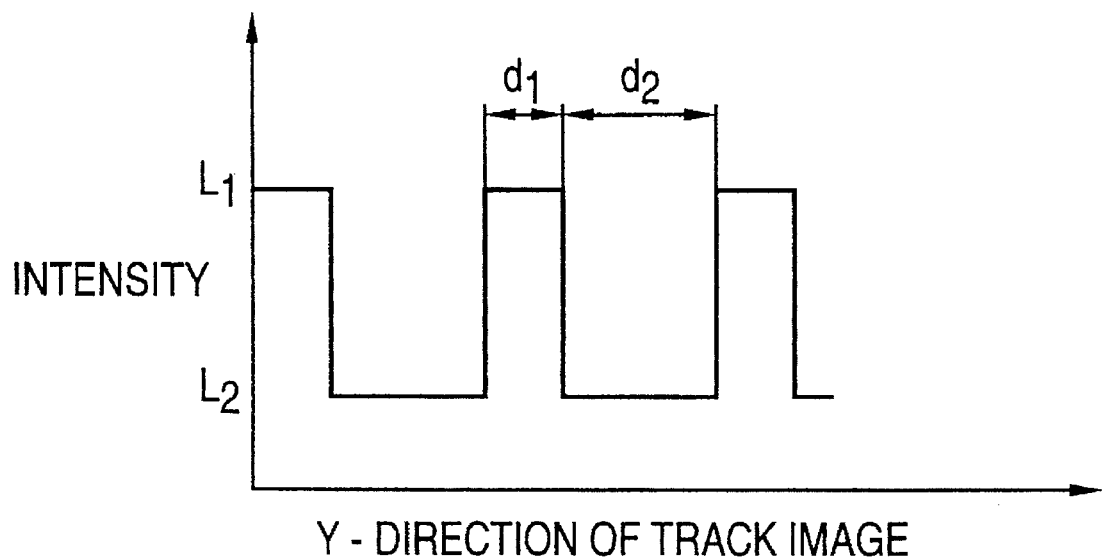
FIG. 4 is a waveform diagram of a luminance signal produced by scanning in the Y direction of the image.

If the two different level recording tracks 18a and 18b are not equal in the width, as shown in FIG. 3, the ratio of width between the two recording tracks is not 1:1. It is now assumed that the intensity level on the magnetic tape 1 is measured along the line 19 of FIG. 3 widthwisely of the magnetic tape 1 or in the Y direction in the image of FIG. 3. As the recording tracks have alternate brightness and darkness levels in the image of FIG. 3, the resultant intensity level signal is a chain of pulses as shown in FIG. 4. The brightness level 18a is expressed by $L_1$ and the darkness level 18b is expressed by $L_2$. The brightness level track 18a has a smaller width than that of the darkness level track 18b, thus causing the duration $d_1$ at $L_1$ of the pulse signal to be narrower than $d_2$ at $L_2$. Although the width is different between the brightness and darkness level recording tracks, the sum of two durations, $T=d_1+d_2$, is constant when the running speed of the recording tape 1 is uniform.

Figure 5:
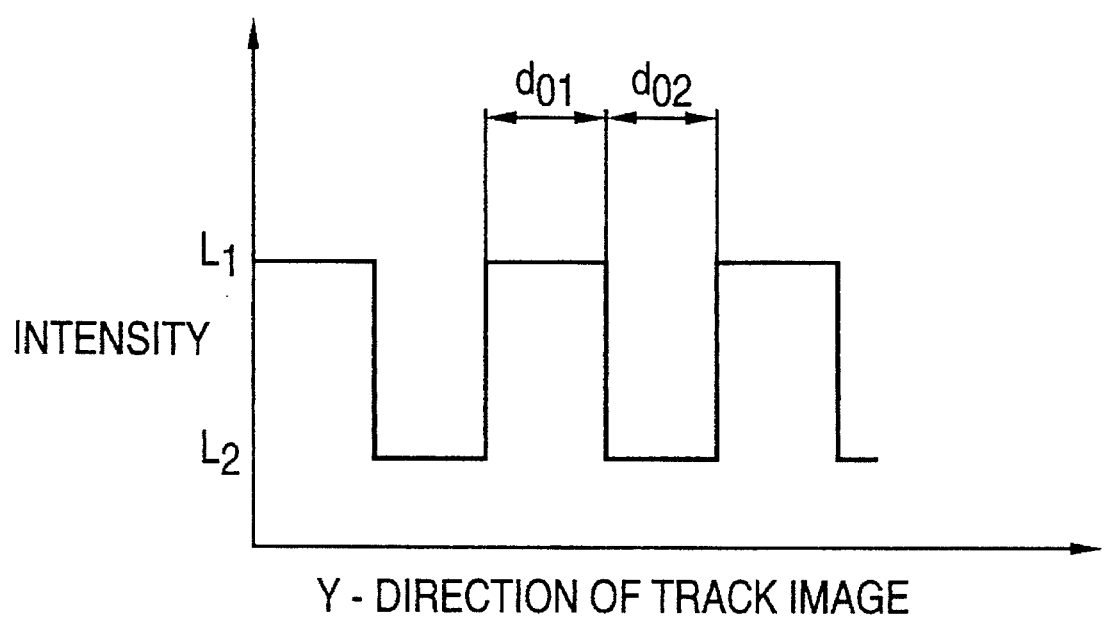
FIG. 5 is a waveform diagram of the signal when the recording track are identical in the width.

FIG. 5 shows the two, brightness and darkness, level recording tracks identical in the width without involving any track width error. As shown in FIG. 5, the two, brightness and darkness, durations $d_{o1}$ and $d_{o2}$ are equal.

The track width error X is then expressed by:

$$X=|d_1-d_{o1}|=|d_2-d_{o2}| \quad (0 \leq X < T/2) \qquad (1)$$

The video signal of the image (of FIG. 3) stored in the image memory 6 is fed to the CPU 8 for processing with the software illustrated in FIG. 2.

The video signal is first subjected to the Fourier transforming process 14 where the one-dimensional process is carried out in the Y direction of FIG. 3 or widthwisely of the magnetic tape 1.

The Fourier transformation may be executed in the X direction of FIG. 3 or lengthwisely of the magnetic tape 1. This however causes the frequency resolution to be less accurate due to increase of the wavelength as the recording track of the VHS system is assigned at an angle of 6 degrees to the running direction of a magnetic tape. Hence, it is preferred to perform the Fourier transformation widthwisely of the magnetic tape 1.

For ease of explanation, the pulse signal of square waveform shown in FIG. 4 is offset at $L_2$ to normalize the amplitude to 1. Also, the origin point is shifted into the center of the brightness level duration, as it is assumed that:

$$d_1=2a \quad (0<2a<T) \qquad (2)$$

$$T=d_1+d_2 \qquad (3)$$

Figure 6:
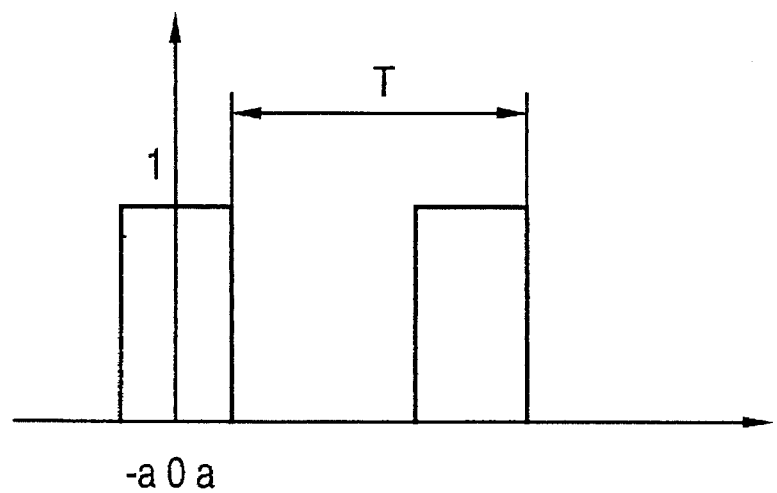
FIG. 6 is a waveform diagram of a normalized representation of the signal of FIG. 4.

As the result, the waveform of the signal is modified as shown in FIG. 6.

The modified waveform of the signal is subjected to the Fourier transformation and a resultant frequency spectrum $F(\omega)$ is expressed by:

$$F(\omega) = 2\pi \cdot \sum_{n=-\infty}^{\infty} \frac{\sin(2\pi n a/T)}{n \cdot \pi} \cdot \delta(\omega - n\omega_1) \qquad (4)$$

where $$\omega_1 = 2\pi/T$$

Also, the function $\delta$ is:

$$\delta(t-t_0) = \begin{cases} 1 & t=t_0 \\ 0 & t \neq t_0 \end{cases}$$

It is therefore found from the equation (4) that the frequency spectrum has a value at a frequency defined by an integer multiple of the first order frequency component $\omega_1$.

Figure 7:
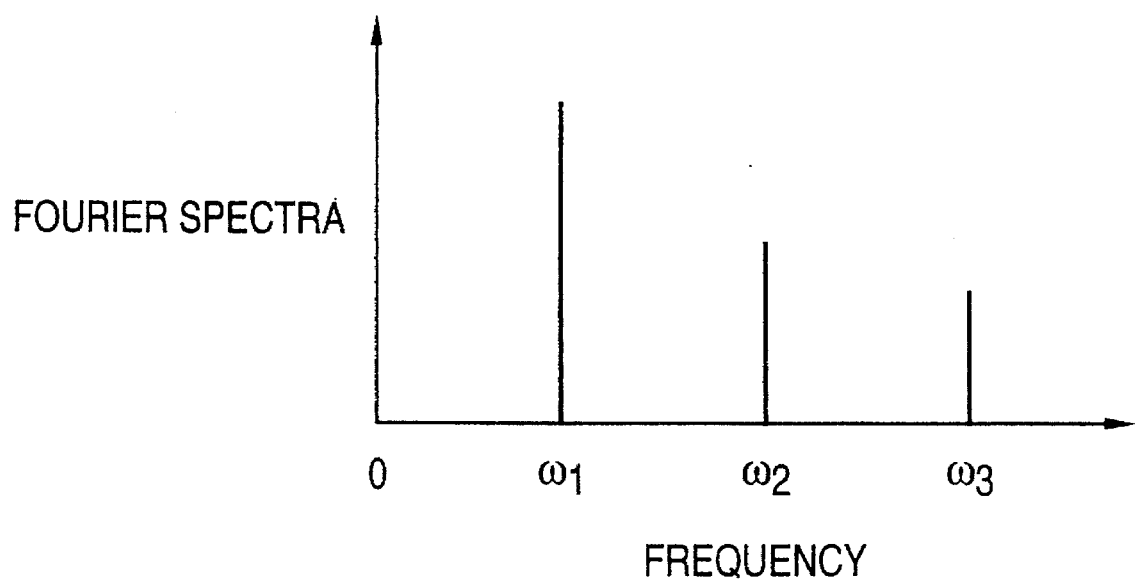
FIG. 7 is a diagram of a frequency spectrum produced by Fourier transformation of the signal waveform of FIG. 4.

FIG. 7 shows a frequency spectrum produced by the Fourier transforming process 14. The pulse signal of FIG. 4 is transformed to the frequency spectrum of FIG. 7 where peaks indicate the integer multiples of the first order frequency component $\omega_1$. The frequency spectrum of an actual image of recording tracks contains some noise frequency components which result from developing unevenness and the presence of dirt, but they are relatively small and negligible and do not affect the processes of the present invention.

Figure 8:
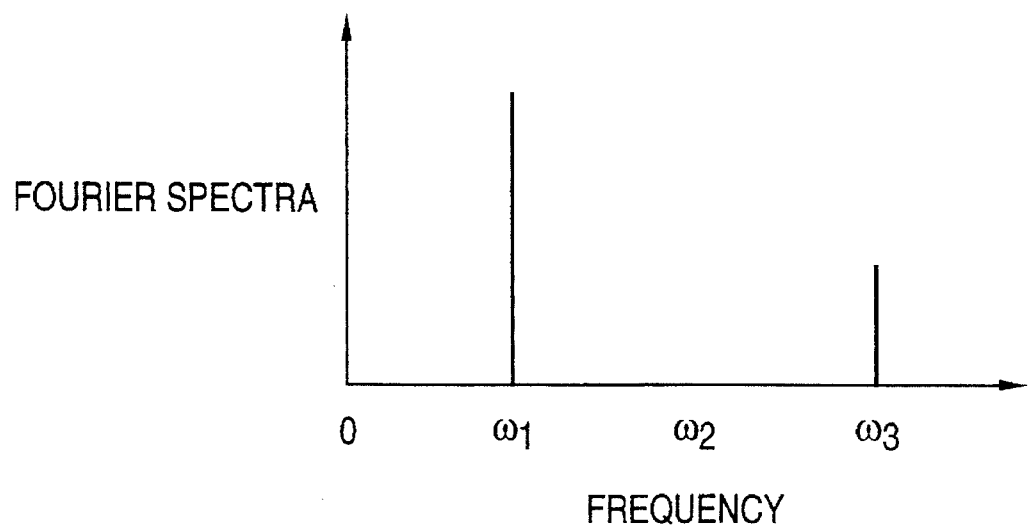
FIG. 8 is a diagram of a frequency spectrum produced by Fourier transformation of the signal waveform of FIG. 5.

Similarly, FIG. 8 shows a frequency spectrum of the image of the recording tracks with a uniform width. When the two adjacent recording tracks are identical to each other in width, the frequency spectrum does not appear at even-number multiples of the first order frequency component, as shown in FIG. B, i.e. the frequency spectrum appears only at odd-number multiples of the first order frequency. This would be understood from the statement of the equation (4). The frequency spectrum varies in response to the track width error.

The first and second order frequency components of the frequency spectrum obtained by the Fourier transforming process 14 are extracted by the spectrum selecting process 15 and fed to the spectrum ratio calculating process 17. When the first frequency component is $F_1$ and the second frequency component is $F_2$, they are calculated from the equation (4), where each frequency component is a positive value as programmed, and expressed by:

$$F_1 = |2 \cdot \sin(2\pi a/T)| \quad (5)$$

$$F_2 = |\sin(4\pi a/T)| \quad (6)$$

At the spectrum ratio calculating process 16, the ratio between the first and second order frequency components is determined for use in the width error calculating process 17.

The spectral ratio R is:

$$R = F_2/F_1 \quad (7)$$
$$= |\cos(2\pi a/T)|$$

Also, $d_{01} + d_{02} = T$ is specified as:

$$d_{01} = d_{02} = T/2 \quad (8)$$

The track width error X is now expressed, using the two equations (1) and (2), as:

$$X = |d_1 - d_{01}| \quad (9)$$
$$= |2a - T/2|$$

Then, the ratio R is expressed, using the equations (7) and (9), as:

$$R = |\cos(X/T + \tfrac{1}{2})\pi| \quad (10)$$

In the width error calculating process, 17, the track width error is calculated from the spectral ratio R. It is assumed that the ratio between width errors is Ov.

$$Ov = 2X/T \ (0 \leq Ov < 1) \quad (11)$$

Then, the equation (10) is turned to:

$$R = |\cos \pi/2(Ov+1)| \quad (12)$$

Figure 9:
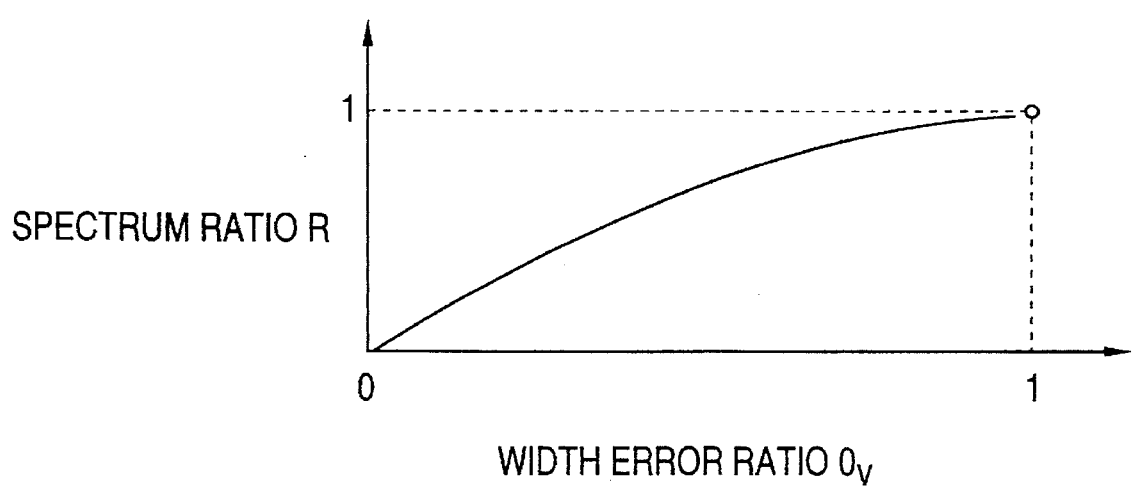
FIG. 9 is a diagram showing the relationship between a track width error ratio and a frequency component ratio.

FIG. 9 is a graphic diagram showing the relationship between the width error ratio Ov and the spectral ratio R. More specifically, the width error ratio Ov corresponding to the spectral ratio R calculated by the spectrum ratio calculating process 16 is determined by reviewing the look-up table 9 defined by the curve shown in FIG. 9. The width error calculating process 17 calculates the track width error X using:

$$X = Ov \cdot T/2 \quad (13)$$

If a system permits the use of an inverted cosine function, the track width error X may be calculated directly from the spectral ratio R using the equation (10).

This sequence of the Fourier transforming process 14, the spectrum selecting process 15, the spectrum ratio calculating process 16, and the width error calculation process 17 is performed throughout the image of the recording tracks to examine errors in the recording track width of the magnetic tape.

The width error values examined throughout the image are transferred through the D/A converter 10 to the monitor 11 or to the plotter 12 for visual display.

Although the ratio between the first order frequency component and the second order frequency component is examined according to the present invention, the ratio between higher order frequency components, e.g. the third and the fourth order frequency component, can be calculated and utilized with equal success. It is however apparent from the equation (4) that their magnitude becomes smaller and examining accuracy becomes worse as the higher order frequency components are employed. It is most preferred to compare the first and second order frequency components.

The present invention is not limited to the assignment of the lengthwise and widthwise directions of the magnetic tape 1 to the X and Y directions in the image of FIG. 3. When inspecting a layer area of the magnetic tape 1 than the single image size of the television camera 2, a plurality of images of the television camera can be utilized by transferring the table 3. In this case, it is preferred to assign the lengthwise direction of the magnetic tape 1 to the X or Y direction in the image for ease of merging the plurality of image data.

What is claimed is:

1. A track width error inspector apparatus for examining a track width error of recording tracks of a magnetic tape, in which a signal of a given frequency range is recorded on alternate tracks with a plurality of magnetic heads, an amount of magnetic powder is applied to the magnetic tape, light is radiated on the magnetic tape, and a reflection of the light from the magnetic tape is detected, the track width error being a difference between the width of the recording tracks and a predetermined track width;

said track width error inspector apparatus comprising:

a movable table on which the magnetic tape to be inspection is disposed;

an image pick-up, said image pick-up producing an enlarged two-dimensional image of the recording tracks in a given surface area of the magnetic tape;

a memory, said memory storing an image data produced by the image pick-up;

a frequency spectrum detector, said detector detecting odd-numbered and even-numbered order frequency components of a frequency spectrum produced by a Fourier transformation of the image data;

a ratio calculator, said calculator calculating a ratio between one odd-numbered order frequency component and one even-numbered order frequency component; and a track width error calculator, said track width error calculator calculating the track width error ratio of the recording tracks from the calculated ratio between the two frequency components wherein the ratio of the track width error increases as the ratio of the frequency components increases.

2. A track width error inspector apparatus for examining a track width error of recording tracks of a magnetic tape, in which a signal of a given frequency range is recorded on alternate tracks with a plurality of magnetic heads, an amount of magnetic powder is applied to the magnetic tape, light is radiated on the magnetic tape, and a reflection of the light from the magnetic tape is detected, the track width error being a difference between the width of the recording tracks and a predetermined track width;

said track width error inspector apparatus comprising:
a movable table on which the magnetic tape to be inspection is disposed;
an image pick-up, said image pick-up producing an enlarged two-dimensional image of the recording tracks in a given surface area of the magnetic tape;
a memory, said memory storing an image data produced by the image pick-up;
a frequency spectrum detector, said detector detecting a first order frequency component and a second order frequency component of a frequency spectrum produced by Fourier transformation of the image data;
a ratio calculator, said calculator calculating a ratio between the first and second order frequency components; and
a track width error calculator, said track width error calculator calculating the track width error ratio of the recording tracks from the calculated ratio wherein between the first and second order frequency components, wherein a ratio of the track width error increases as the ratio of the frequency components increases.

3. A track width error inspector apparatus according to claim 1, wherein the frequency spectrum detector performs a Fourier transformation in a width direction of the magnetic tape.

* * * * *